Dec. 14, 1926.
E. R. INMAN
1,611,038
PUMPING EQUIPMENT FOR TRACTORS
Filed June 16, 1924     2 Sheets-Sheet 2
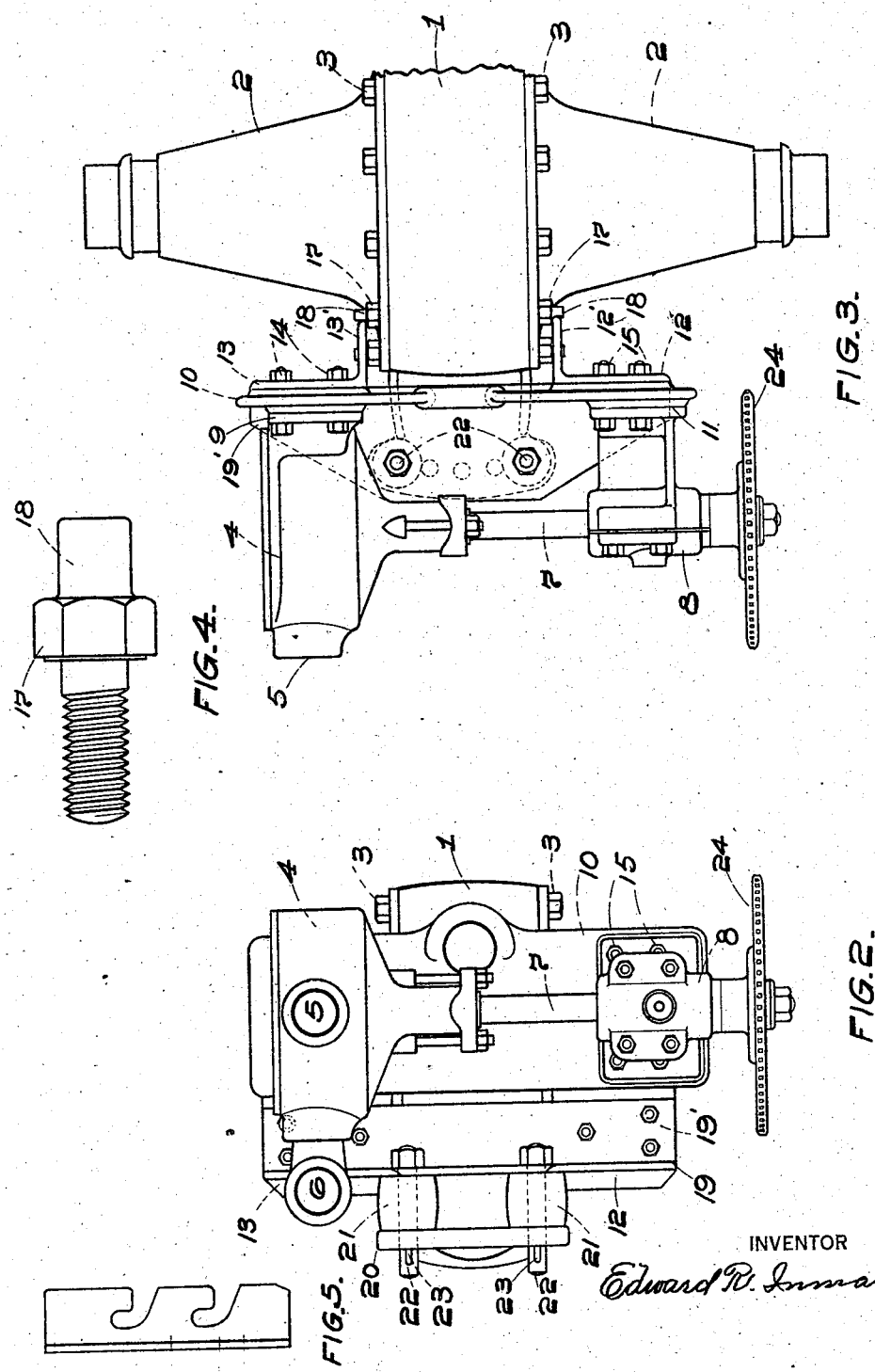
INVENTOR
Edward R. Inman Patented Dec. 14, 1926.

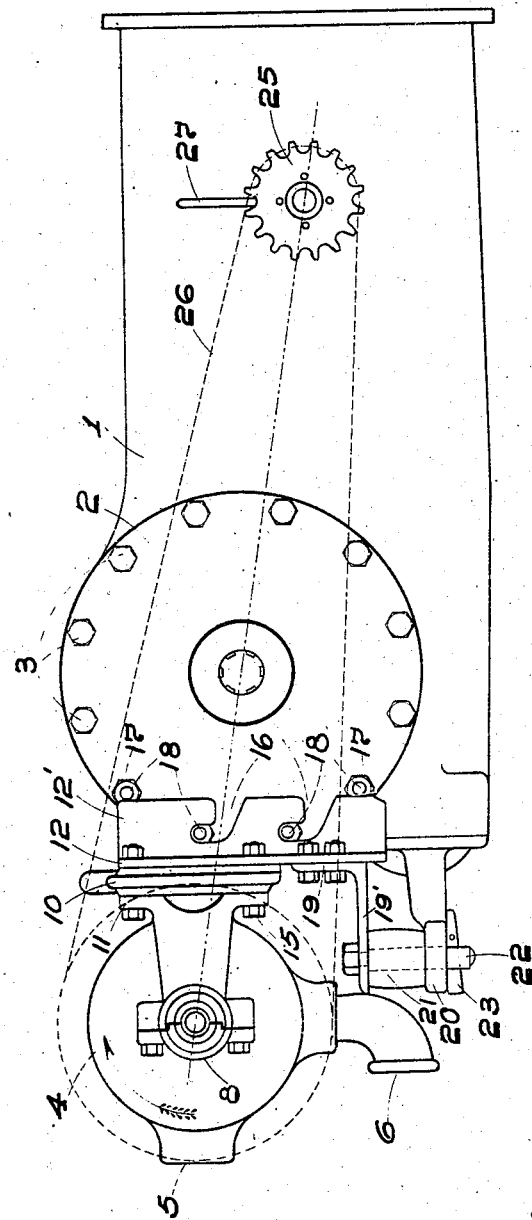

1,611,038

UNITED STATES PATENT OFFICE.

EDWARD R. INMAN, OF FRANKLIN, PENNSYLVANIA.

PUMPING EQUIPMENT FOR TRACTORS.

Application filed June 16, 1924. Serial No. 720,470.

The objects, construction, application and operation of my improved pumping equipment for tractors are herein set forth with sufficient clearness to enable others skilled in the arts to which its construction and use respectively relate, to make and use the same.

The objects of this invention are:

1. To supply a simple and efficient portable pumping equipment for general pumping service, which may be attached to and detached from a tractor at will, and operated from a power take-off with which such tractor is supplied for the operation of extraneous machinery.

2. To supply a pumping equipment of such nature and construction, that it may be attached to and detached from a tractor with sufficient facility as to render it suitable for fire fighting service, in such localities and classes of service, as tractors are generally employed.

3. To supply an efficient and comparatively simple pumping equipment for agricultural and horticultural service, suitable for the spraying of fruit trees, vines, etc., also for the application of insecticides, fungicides, etc., as well as the pumping of water for general purposes.

4. To supply a readily portable and efficient pumping outfit for use in the petroleum producing industry, suitable for pumping petroleum for comparatively short distances through pipe lines, and for such other surface pumping as may be desired.

The construction whereby I am enabled to attain said objects is clearly illustrated in the accompanying drawings in which:

Fig. 1 is a side elevation of the rearward portion of a tractor frame showing my improved pumping equipment attached thereto.

Fig. 2 is a rear elevation of said equipment.

Fig. 3 is a plan view of said equipment and the adjacent portions of the frame of a tractor.

Fig. 4 is an illustration of one of the hanger cap screws which is arranged for engagement by the hanger members by means of which my pumping equipment is attached to the tractor.

Fig. 5 is a side elevation of one of the hanger members mentioned in the preceding paragraph.

My improved pumping equipment is adapted to be attached to and operated by any suitable type of tractor, and especially that type of which, those manufactured by the International Harvester Co., and the Ford Motor Company are typical examples.

The construction illustrated in said drawings is substantially as follows:

The transmission housing of a tractor is indicated at 1 and the axle housings, which are attached to said transmission housing, are indicated at 2. Said axle housings are attached to the tranmission housing by means of cap screws 3. As shown in said drawings, there are twelve of these cap screws, but this may not be the case in all sizes of tractors or in tractors of the same power rating manufactured by different manufacturers; however, in any case, the number of cap screws employed and the arrangement and spacing of same are such that my pumping equipment may be readily adapted to be attached thereto in substantially the manner indicated in the drawings.

The pump body or casing, which, in the drawings, is shown as being of the rotary type, is indicated at 4, and is provided with a suction port 5 and a discharge port 6, assuming that the rotor of said pump revolves in the direction indicated by the arrow in Fig. 1. The shaft of said pump is indicated at 7, and an outboard bearing for said pump is indicated at 8. Said pump is provided with a base 9 by means of which it is secured to the rearward face of a base plate 10; said outboard bearing is also provided with a base 11 by means of which it, also, is attached to said rearward face of said base plate.

To the forward face of said base plate two hangers,—Fig. 5—are attached each of which is a structural steel angle, having the legs 12, 12' and 13, 13' respectively. One leg, 13, of one of said hangers is in contact with the forward face of said base plate 10 and is positioned opposite to the base 9 of the pump. Four bolts, two of which are indicated at 14 in Fig. 3 pass through and secure said base 9, base plate 10 and leg 13 firmly together. One leg, 12, of the other hanger is in contact with the forward face of said base plate and is positioned opposite to the base 11 of said outboard bearing and four bolts 15 pass through and secure said base 11, base plate 10 and leg 13 firmly together.

The other leg 12' and 13' of said hangers respectively, projects forwardly and their opposing faces are spaced apart to a distance which is substantially equal to the over-all dimension or distance between the outer faces of the heads of said cap screws 3, as will be plainly seen by a reference to Fig. 3 of the drawings.

Said legs 12′ and 13′ are each provided with one or more L-shaped gaps or slots 16 for the purpose of receiving and engagement with special cap screws (Fig. 5) the construction, arrangement and office of which are as follows. As shown in Fig. 1, the four most rearwardly positioned cap screws originally used on the tractor for securing the axle housings 2 to the transmission housing, are removed and specially-formed hanger cap screws 17 are inserted in the place of the regular cap screws thus removed; said hanger cap screws differ from said originally-supplied cap screws in the respect that the outer end thereof, in addition to being supplied with the usual head, are provided with an engageable pin 18 for the purpose of engagement and cooperation with said slots 16 formed in said legs 12′ and 13′ of said hangers, Fig. 5, as illustrated in Figs. 1 and 3.

After said hanger cap screws have been supplied, the pump equipment is connected to or suspended from said transmission housing by positioning said hanger legs 12′ and 13′ upon opposite sides of the transmission housing then moving said pump structure forward until the two most rearwardly positioned hanger pins 18 have entered the open, horizontally-disposed branch of the respectively-adjacent slots 16, whereupon the pump structure is lowered until said rearward pins 18 occupy the upper end of the vertically-extending branch of said slots 16. In this position, the forward edge of said legs 12′ and 13′ bear upon the other two upper and lower, adjacent pins 18 and the pump is thereby securely suspended upon the tractor frame.

Said hanger members extend below the base plate 10 and one leg of a transversely-extending cross angle is securely attached to the lower ends of said members; the other leg 19′ of said cross-angle extends rearwardly and projects over the draw-bar lug 20, and is spaced above the same. In the space thus formed between the lower face of said leg 19′ and the upper face of said draw-bar lug 20 is interposed a suitable resilient shock-absorber, and, as shown in the drawings, said absorber consists of two members 21, 21, which are preferably composed of rubber, although they may be composed of wood, or they may be steel compression springs. Nearly any kind of material having a shock-absorbing capacity would be suitable for said members 21, the office of said absorbers being to relieve to a certain extent the downward strain upon the pins 18 due to the weight which would be otherwise exerted by the pump upon said pins, were no provision of this sort made, also to eliminate the shock and jar upon the pump caused by the lugged wheels of the tractor traveling over hard-surfaced streets and highways.

Securing pins 22, 22, pass through a hole provided for each thereof in said leg 19′ and through said absorbers 21, also through said draw bar 20, and tapered keys 23, which pass through slots provided therefor in the lower projecting end of said pins and have contact with the lower face of said drawbar lug, serve to draw said leg 19′ downward and cause the same to bear firmly upon said absorbing members, and at the same time impart stability to the pump equipment.

The outer end of the pump shaft is provided with a rigidly-attached sprocket 24, arranged for the purpose of operating the pump. The power take-off, which in this case is the pulley-shaft of the tractor, and is provided for the operation of extraneous machinery, is equipped with a sprocket 25; a chain 26 shown in dotted lines in Fig. 1 is employed to transmit operative power from said sprocket 25 to the pump sprocket 24.

Said sprocket 25 is preferably provided with any suitable form of clutch arranged for operably engaging said sprocket with the power-transmitting gearing of the tractor and the disengagement of same therefrom. One well-known form of such clutch, which is well known commercially as the "Smith unit" and is provided with a shipping lever 27 whereby said clutch may be disengaged and reengaged at will, and whereby the transmissive function of said sprocket 25 may be rendered operative or inoperative, at will, is the one which I prefer to use with my improved pumping equipment.

I claim the following:

1. In a pumping equipment for tractors, the combination with a tractor having a power take off for the purpose of operating extraneous machinery and also having engageable means arranged for the engagement of attaching means whereby said equipment is connected to said tractor, said pumping equipment comprising in combination, a pump, a shaft arranged to operate said pump, a base plate to which said pump is secured, means attached to said base plate provided with an L-shaped slot adapted to be engaged with said engageable means whereby said pump may be mounted upon said tractor and demounted therefrom at will, and flexible transmission means whereby operative power is transmitted to said pump shaft from said power take off; said shaft being laterally spaced relative to said power take-off.

2. In a pumping equipment for tractors, the combination with a tractor having a power take off for the purpose of operating extraneous machinery and also having pins arranged for engagement with attaching means whereby said equipment is connected to said tractor, said pumping equipment comprising in combination, a pump, a shaft arranged for the operation of said pump, a base plate to which said pump is secured, means attached to said base plate provided with suitably-formed slots arranged and adapted to be loosely engaged with said engageable means whereby said pump may be mounted upon said tractor and demounted therefrom at will, means other than said pins arranged to support the weight of said pumping equipment, and clutch-controlled transmission means whereby operative power may be transmitted to said pump shaft from said power take off.

3. In a pumping equipment for tractors, a tractor having a power take off for the operation of extraneous machinery also engageable pins carried by the frame of said tractor arranged to be engaged by hangers carried by said equipment; in combination with a pumping equipment comprising in combination, a pump of the rotary type, an operating shaft for said pump, a base plate to which said pump is attached, hangers carried by said pumping equipment arranged to engage said engageable means so as to mount said pump upon said tractor, a securing element carried by said equipment in proximity to the draw-bar of the tractor, a securing pin passing through said securing means and said lug whereby the assembly of said equipment with said tractor is maintained, and clutch-controlled transmission means arranged for the transmission of operative power from said power take off to said pump shaft.

4. In a pumping equipment for tractors, a tractor having a power take off arranged for the operation of extraneous machinery also engageable means carried by the frame of said tractor arranged for the engagement of hangers carried by said pumping equipment; in combination with a pumping equipment comprising in combination, a rotary pump, an operating shaft for said pump, a base plate to which said pump is attached, hangers secured to said base plate arranged and adapted for engagement with said engageable means of said tractor whereby said pump is mounted upon said tractor, a horizontally-extending flange carried by said hangers extending over the draw bar lug of the tractor and arranged in spaced relation thereto, shock-absorbing means interposed between the opposing faces of said lug and said flange for the purpose specified, and transmission means adapted for the transmission of operative power from said power take off to said operating shaft of said pump.

In testimony whereof I affix my signature.

EDWARD R. INMAN.